Dec. 31, 1968  O. N. LAWRENCE ET AL  3,419,106
HOVER HEIGHT CONTROL APPARATUS FOR AIR CUSHION VEHICLES
Filed July 12, 1966

United States Patent Office 3,419,106
Patented Dec. 31, 1968

3,419,106
HOVER HEIGHT CONTROL APPARATUS FOR AIR CUSHION VEHICLES
Owen Napier Lawrence, Great Alne, near Alcester, and Geoffrey Albert Long, Sutton Coldfield, England, assignors to Joseph Lucas (Industries) Limited, Birmingham, England
Filed July 12, 1966, Ser. No. 564,581
3 Claims. (Cl. 180—119)

ABSTRACT OF THE DISCLOSURE

Hover height control apparatus for an air cushion vehicle comprising a probe arranged to engage with the surface over which the hovercraft is travelling, and a control device on the vehicle to which the probe is connected, and which is capable of producing a signal in response to deviations in the height of the vehicle, said signal being applied to power means whereby the height of the hover of the vehicle can be varied.

---

This invention relates to height control apparatus for maintaining the height of hover of an air cushion vehicle which is selected by a driver thereof.

The object of the invention is to provide a height control apparatus in a convenient and effective form.

In accordance with the present invention, hover height control apparatus for an air cushion vehicle comprises a probe arranged in use, to be engageable with and movable along the surface over which the air cushion vehicle is travelling, and a control device arranged to be secured to the craft, to which the probe is operatively connected, said control device being capable of producing a signal in response to deviations in height of the craft from a driver selected height, and means provided for transmitting said signal to power means for varying the height of hover of the air cushion vehicle.

Figure 1:
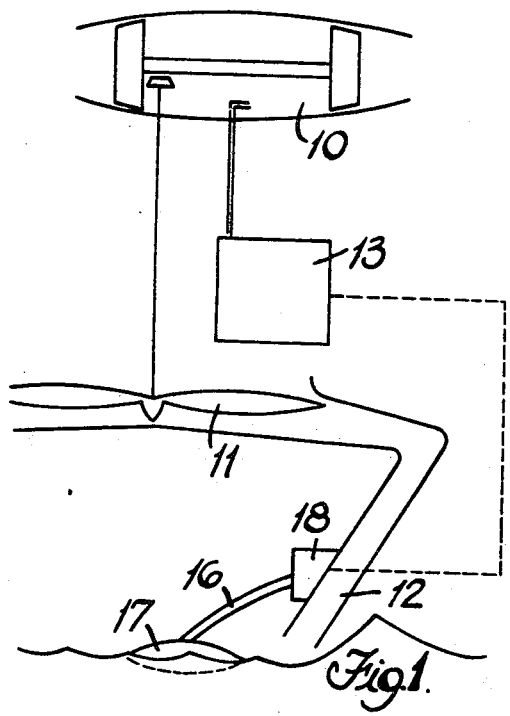
Figure 2:
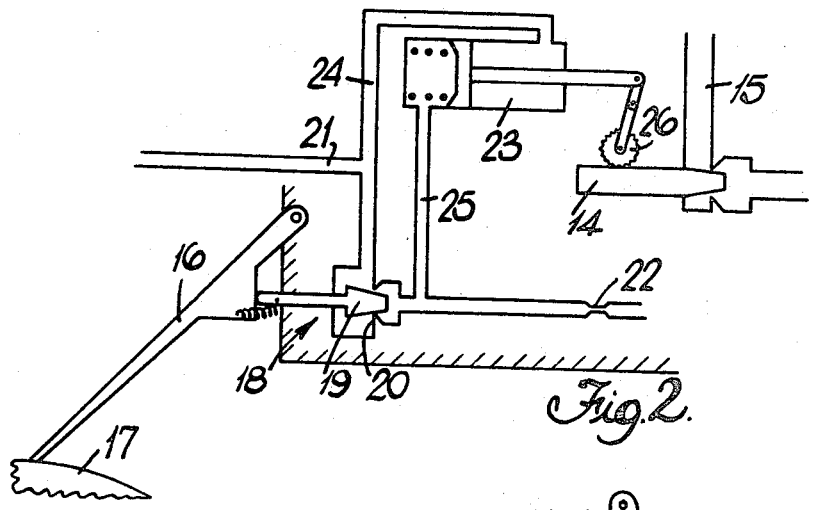
Figure 3:
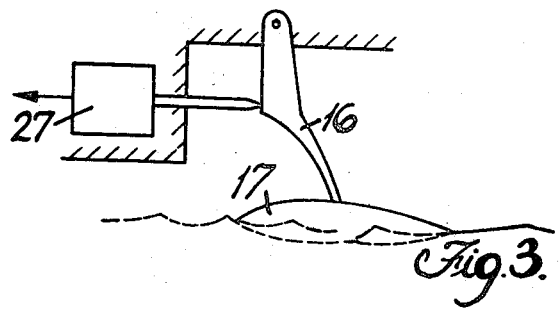

The invention will now be described by way of example with reference to the accompanying drawings in which:

FIGURE 1 is a diagrammatic representation of one form of apparatus constructed in accordance with this invention, FIGURE 2 is a diagrammatic layout of a fuel system which can be used in the apparatus shown in FIGURE 1, FIGURE 3 is a diagrammatic representation of an alternative control device for use in the apparatus of FIGURE 1.

This invention is applied to an air cushion vehicle having a power unit in the form of a gas turbine engine 10, a fan 11, and a hollow skirt 12 through which air is directed from the fan so as to maintain, between the skirt and a surface over which the craft can travel, a cushion of air. The height of the air cushion vehicle above a surface, which may be water or land, is determined by the supply of air to the skirt 12 and this may be controlled manually by control of the speed of the engine, or by varying the pitch of the fan 11.

In the example of the invention shown in FIGURES 1, 2 and 3, the height is controlled by controlling the quantity of fuel delivered to the engine, through the system designated 13 in FIGURE 1. The selection by the driver of a height of hover results in the throttle 14 (FIGURE 2) being set to permit a predetermined flow of fuel through the duct 15.

In the event of the air cushion vehicle deviating from the selected height, as a result for example, of rough water conditions or mildly uneven ground, a probe 16, which may carry a float 17 as illustrated, or a wheel, or possibly both, operates a control device 18. The control device produces a signal, the magnitude of which is dependent upon the deviation from the selected height. This signal is compared with a signal derived from the flow rate of air to the skirt 12, which may be obtained from the skirt 12 or from the engine.

FIGURE 2 shows a mode of achieving this signal comparison, the signal from the probe 16 being in the form of mechanical movement of a plunger 19 through an orifice 20 in a duct 21, through which air from the fan 11 is fed. Air from the fan can also reach a variable restriction 22, through the duct 21 and orifice 20, a comparison being made between the pressures upstream of the orifices 20 and restriction 22 respectively and air at these pressures being respectively led to opposite sides of a piston of a servo mechanism 23 through ducts 24 and 25 respectively. The piston of the servo mechanism 23 is connected to a rack and pinion mechanism 26 connected to the throttle 14 in the fuel system. It will be understood that the throttle 14 is not usually the main engine throttle, which is no illustrated. Variation of the restriction 22 varies the performance of the fuel control system 13.

In the construction shown in FIGURE 3, the control device is in the form of an electrical transducer 27 and this produces an electrical signal in accordance with a deviation from the selected height of hover.

Having thus described out invention what we claim as new and desire to secure by Letters Patent is:

1. Hover height control apparatus for an air cushion vehicle having power means for providing a cushion of air for supporting the vehicle, said power means comprising an engine, an associated fuel system and a fan driven by the engine, the apparatus comprising a probe arranged to engage a surface over which the vehicle travels, a control device securable to the vehicle, the probe being connected to the control device, signal producing means in the control device responsive to changes in the position of the probe, and transmission means for transmitting said signal to the fuel system of the engine to affect the flow of fuel to said engine and thereby vary its speed and the speed of the fan and thus the height of hover of the vehicle.

2. Hover height control apparatus as claimed in claim 1, in which the signal producing means generate an electrical signal.

3. Hover height control apparatus for an air cushion vehicle having power means for providing a cushion of air for supporting the vehicle, said power means comprising an engine, an associated fuel system, a throttle controlling fuel supply in said fuel system, and a fan driven by the engine, the apparatus comprising a probe arranged to engage a surface over which the vehicle travels, a control device securable to the vehicle, a plunger in the control device connected to the probe, passage means in the control device through which air under pressure is passed, said plunger controlling the pressure of air through the passage means, a servo device connected to the throttle of the fuel system, said servo device being operable in response to changes in pressure in the passage means, changes in the position of the throttle controlling fuel supply to the engine and the height of hover of the vehicle.

References Cited

UNITED STATES PATENTS

| | | | |
|---|---|---|---|
| 2,272,822 | 2/1942 | Rausch | 180—105 X |
| 3,174,569 | 3/1965 | Eggington | 180—118 |
| 3,182,739 | 5/1965 | Cockerell | 180—118 |
| 3,215,218 | 11/1965 | Hurst | 180—118 X |

A. HARRY LEVY, *Primary Examiner.*